(12) United States Patent
Craft

(10) Patent No.: US 6,245,232 B1
(45) Date of Patent: Jun. 12, 2001

(54) OIL FILTRATION SYSTEM AND ADAPTER

(75) Inventor: Robert B. Craft, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/364,966

(22) Filed: Jul. 30, 1999

(51) Int. Cl.[7] .................................................. B01D 35/00
(52) U.S. Cl. ......................... 210/249; 210/168; 210/181; 210/DIG. 17
(58) Field of Search ................................. 210/168, 171, 210/181, 184, 249, 416.5, 774, 805, DIG. 17; 165/119

(56) References Cited

U.S. PATENT DOCUMENTS

| | | | |
|---|---|---|---|
| 3,463,317 | * 8/1969 | Prier | 210/181 |
| 3,929,643 | * 12/1975 | Donaldson et al. | 210/181 |
| 5,039,406 | 8/1991 | Whittington | 210/168 |
| 5,546,999 | * 8/1996 | Parker | 210/168 |
| 5,567,306 | * 10/1996 | De Wachter | 210/416.5 |

* cited by examiner

Primary Examiner—Matthew O. Savage
(74) Attorney, Agent, or Firm—Rader, Fishman & Grauer PLLC

(57) ABSTRACT

The present invention is directed to an apparatus suitable for filtering oil used in connection with a mechanical transmission. The apparatus includes a transmission having an oil circulator, typically an oil pump, at least one transmission inlet and at least one transmission outlet to facilitate the flow of oil through the transmission; an oil filter in communication with the transmission inlet and transmission outlet; and an adapter connected to the filter and the transmission. The oil filter, which may be of the conventional spin-on type, is positioned for ease of access and may be inspected and/or replaced without having to remove an oil pan or to drain a significant amount of oil from the system. Moreover, the system is readily adapted to conventional equipment and can further include an oil cooler.

2 Claims, 4 Drawing Sheets

OIL FILTRATION SYSTEM AND ADAPTER

RELATED APPLICATIONS

The subject matter of this application is related to Applicant's copending application entitled "Pressure Lubrication System For Countershaft Transmissions", application Ser. No. 09/364,391, filed concurrently herewith on Jul. 30, 1999, the content of which is hereby incorporated by reference.

FIELD OF THE INVENTION

The present invention relates generally to an oil filtration system. More particularly the present invention relates to an oil filtration system including a filter and an adapter that is suitable for filtering oil in a mechanical transmission.

BACKGROUND OF THE INVENTION

Transmission systems are a vital link in the powertrain of any vehicle. In vehicles, the purpose of the transmission system is to employ gears of various sizes to provide an engine with a mechanical advantage over the driving wheels. Maintaining good lubrication is a key to proper operation and long-lasting transmission life. Significant problems often result if the amount of oil falls below minimum levels or if the oil becomes too dirty.

Transmission system lubricants include single and multiple viscosity gear oils, engine oils, and automatic transmission fluids. Such fluids can be petroleum-based, partially synthetic, or entirely synthetic. To reduce wear and friction inside a transmission, some lubricants are further mixed with friction modifiers or other additives.

Proper flow characteristics of the fluid are also important in transmission operation. If the fluid flow is inadequate, the chances of a leak increases, parts may prematurely wear due to a lack of adequate lubrication, system pressure will be reduced, and overall hydraulic control will be less effective.

When a transmission is in use, especially in harsher applications, such as when towing or undergoing continual stop-and-go movements, the oil or lubricant can often pick up shavings and other particles. While the majority of the particles in the transmission are encountered in the first several thousand miles of operation, activities such as the snubbing of clutching teeth can cause such particles to exist over the life of the unit. Accordingly, it is recommended that the oil or lubricant be changed periodically, and generally no less frequently than as specified by the manufacturer. For most transmission lubrication systems, the procedure necessarily involves removing an oil pan to drain the transmission lubricant, although some transmission pans include a drain plug for such a purpose.

To provide additional protection for the system, a filter or screen is often attached to a valve body located above the oil pan. Conventional filters are made of paper or fabric, and are generally held in place by screws, clips, or bolts. Unfortunately, in most conventional transmission lubrication systems, the transmission oil drain pan must be removed and the oil in the system drained before the filter can be unbolted from the valve body to be inspected and/or replaced. With the great amount of work and inconvenience involved with accessing conventional transmission filters, such filters are rarely inspected and/or replaced as part of a preventative maintenance effort. Further, because a significant portion of the wear on a transmission occurs during the first several thousand miles of operation, most conventional filters are designed for the initial "break-in" period of the transmission, not for future maintenance over the life of the system.

Because of the effort and difficulty involved with maintaining conventional transmission systems, there is a need in the industry for an oil filtration system having a filter that can be more easily accessed, inspected and/or replaced—without requiring the draining of a significant amount of the oil or lubricant from the system.

SUMMARY OF THE INVENTION

The present invention recognizes the disadvantages and limitations commonly associated with the operation and maintenance of conventional transmission oil lubrication and filtration systems.

By constructing an oil lubrication/filtration system in accordance with an aspect of the present invention, the functionality and maintenance of the system can be greatly improved. Further, the present invention provides the additional advantage of being readily adapted for inclusion in conventional oil lubrication/filtration systems.

In accordance with one aspect of the present invention, an oil filtration system is provided that includes a transmission, an oil filter, and an adapter. The transmission includes an oil circulator, usually an oil pump, and at least one transmission inlet and at least one transmission outlet to facilitate the flow of oil through the transmission. The oil filter, which may be of the conventional spin-on type, is in communication with the transmission inlet and transmission outlet. The adapter, which contains a plurality of passages, is connected in some manner to both the filter and the transmission. The filter is positioned for ease of access for inspection and/or replacement without requiring the removal of an oil pan and/or the draining of a significant amount of oil from the system. Moreover, the system is readily adapted to conventional transmission lubrication systems, which may also include an oil cooler.

BRIEF DESCRIPTION OF THE DRAWINGS

The present invention will be more readily understandable from consideration of the accompanying drawings, wherein:

FIG. 2a is an enlarged view of an alternate embodiment of the system in which the transmission inlet and outlets and corresponding apertures have a different orientation than that depicted in FIG. 2.

DETAILED DESCRIPTION OF PREFERRED EMBODIMENTS

Figure 1:
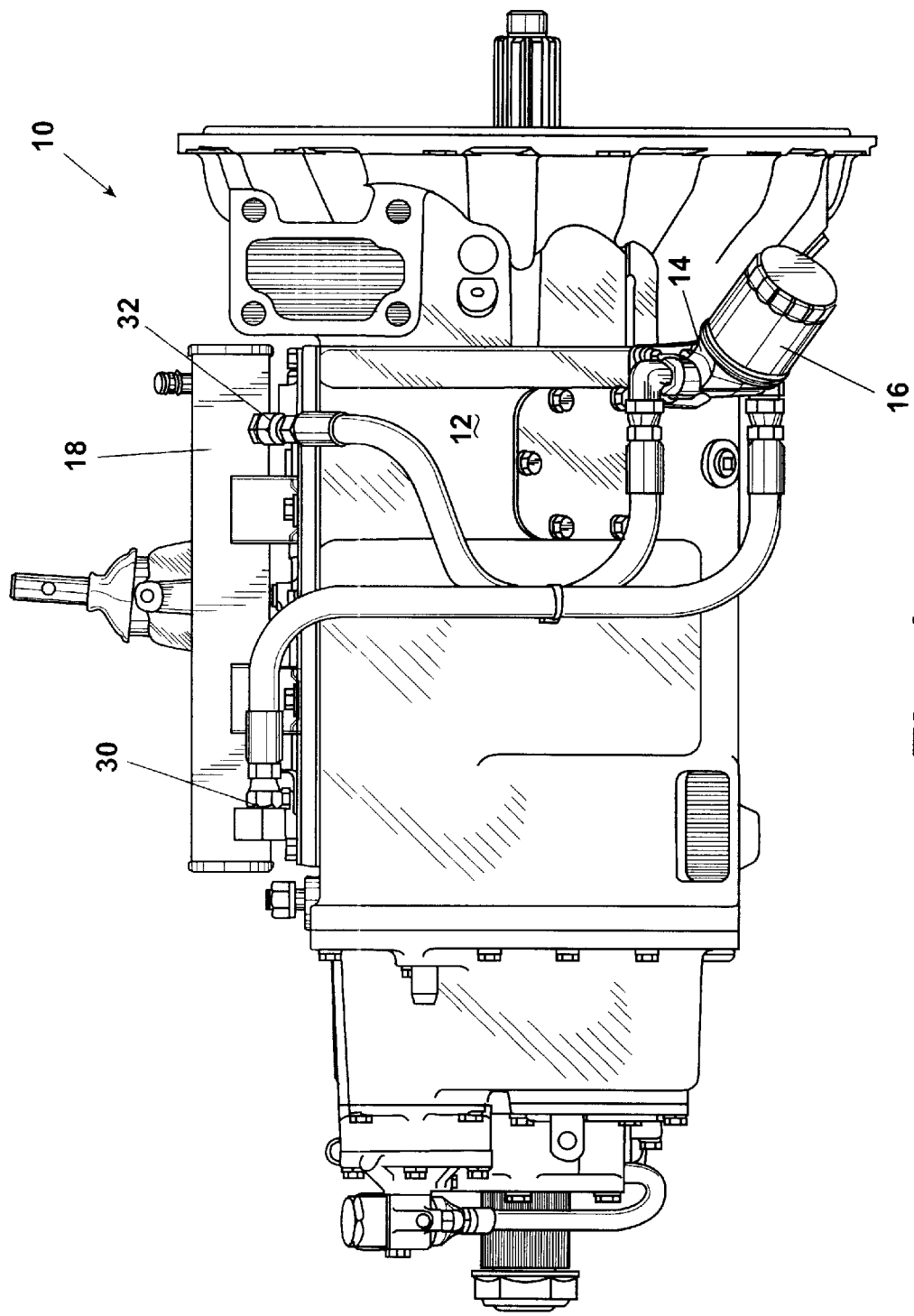
FIG. 1 is a side elevation view of an embodiment of lubrication filtration system constructed in accordance with the present invention.

Referring to FIG. 1, a preferred embodiment of a lubrication filtration system 10 in accordance with the principles of the present invention is shown. The apparatus or system 10 includes a transmission 12, an adapter 14, and a filter 16. In a number of applications the system 10 will also preferably include an optional oil cooler 18. However, such an oil cooler 18 is not required for the practice of the present invention.

Figure 2:
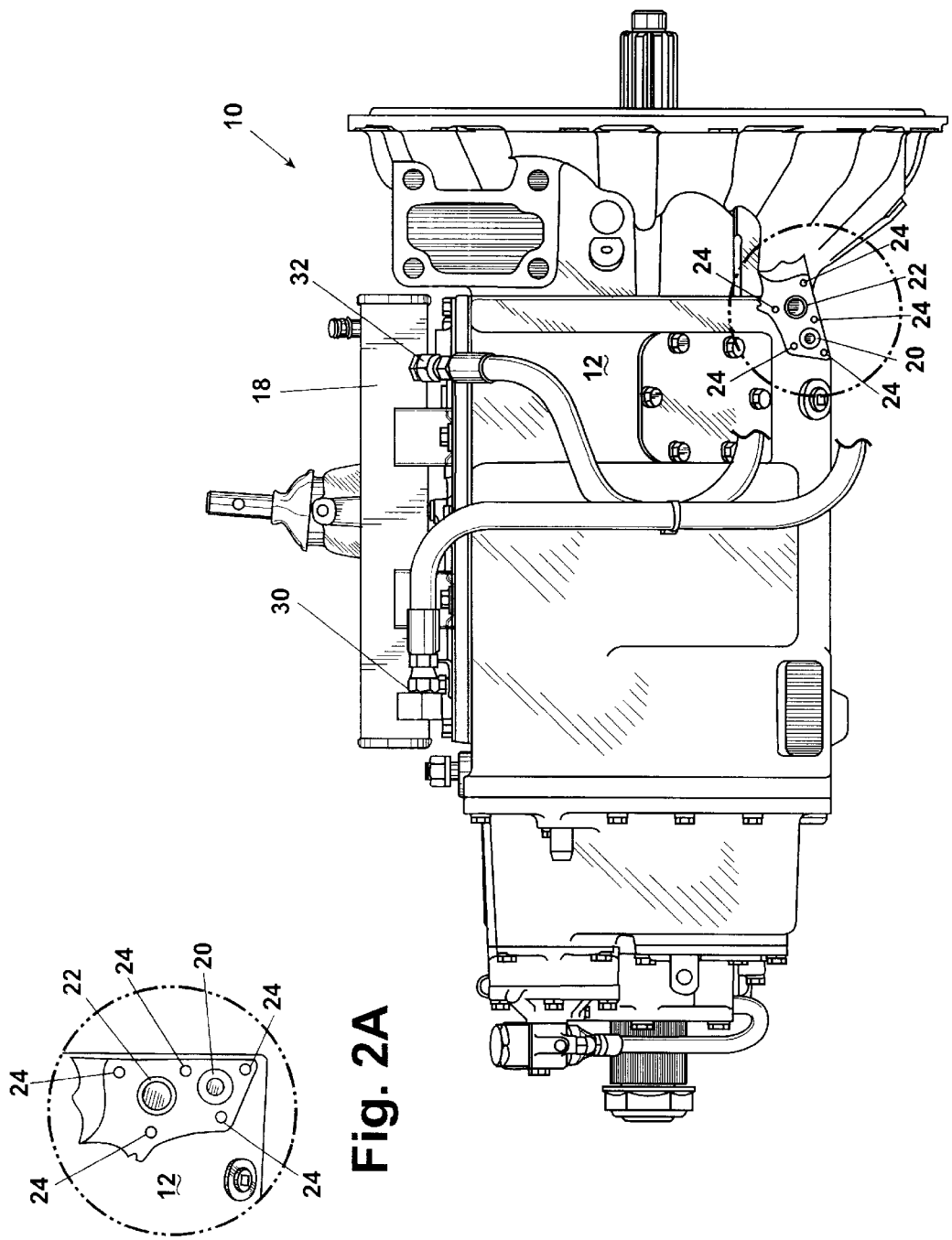
FIG. 2 is a side elevation view of a filtration system as shown in FIG. 1 in which the adapter and filter have been removed from the lubrication filtration system.

FIG. 2 is an embodiment of the system 10, such as that shown in FIG. 1, in which the adapter 14 and filter 16 have been removed. FIG. 2a is an enlarged view of an alternate embodiment of the system in which the transmission inlet and outlets and corresponding apertures have a different orientation than that depicted in FIG. 2.

The transmission 12 may be of a conventional type used in vehicles such as, for example, a twin countershaft transmission. The transmission 12 includes an internal oil circulator, usually a conventional oil pump (not shown), at least one transmission outlet 20 and at least one transmission inlet 22. The outlet 20 and inlet 22 provide ingress and egress into the transmission 12 and facilitate the flow of oil through the transmission 12.

Figure 3:
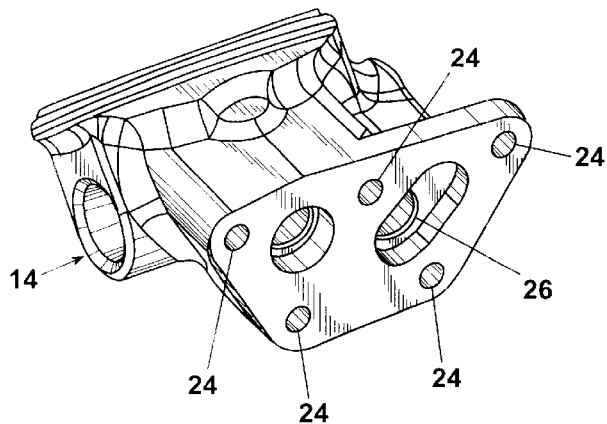
FIG. 3 is a perspective view of an embodiment of an adapter.
Figure 4:
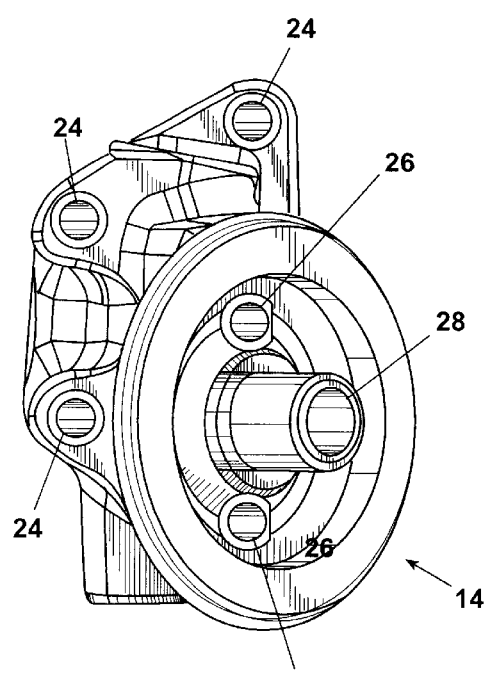
FIG. 4 is a perspective view of an adapter such as that shown in FIG. 3 taken from a different direction.

The adapter 14 is in communication with the transmission 12 and includes a plurality of passageways for facilitating the flow of the oil or lubricant through the adapter 14, and consequently through the system 10. A perspective view of an adapter 14 formed in accordance with the principles of the present invention is illustrated in FIG. 3. Additional views of such an adapter 14 are shown in FIGS. 4–6.

Figure 5:
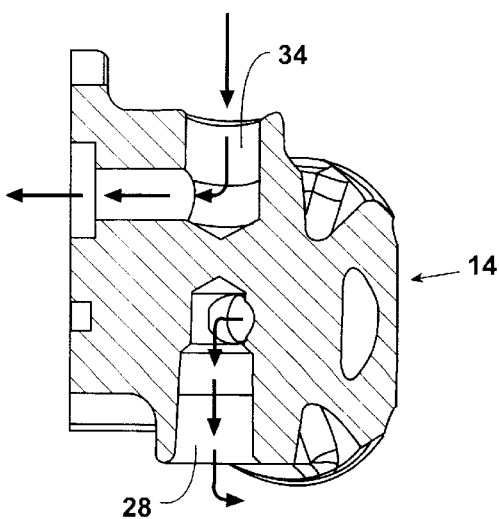
FIG. 5 is a cross sectional view of an adapter that generally illustrates a potential arrangement for the flow of lubricant to and from an external oil cooler.
Figure 6:
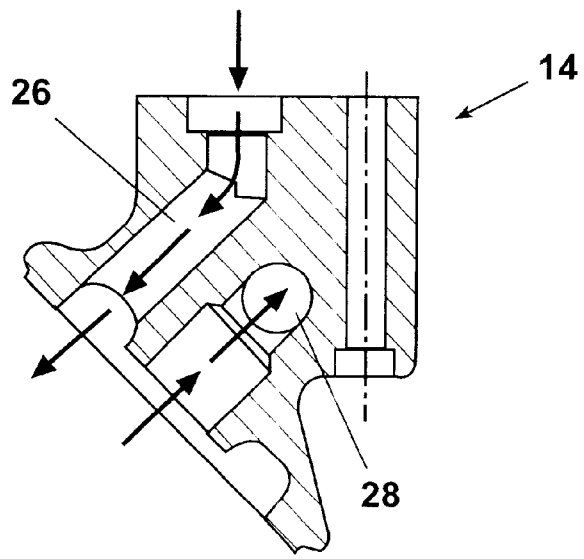
FIG. 6 is a cross sectional view of another embodiment of an adapter.
Figure 7:
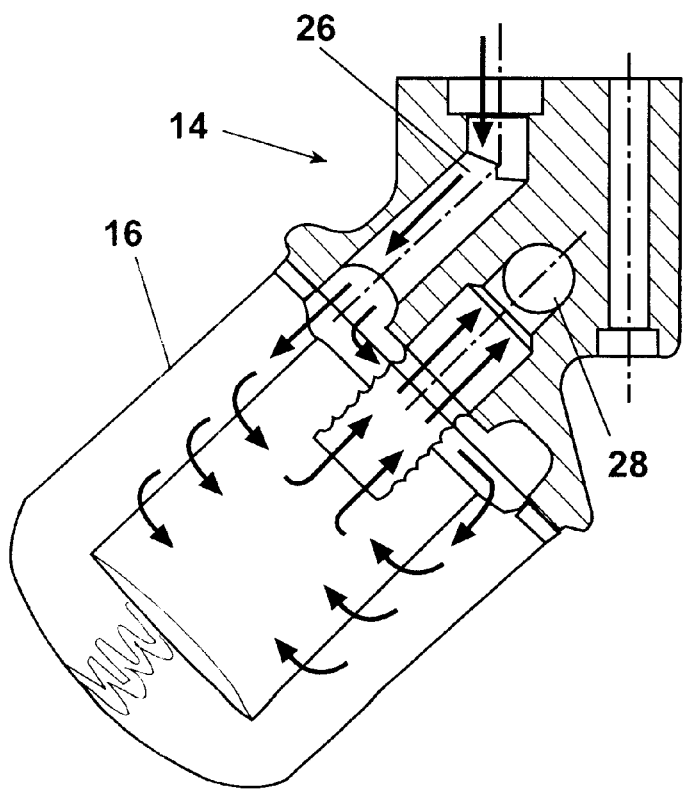
FIG. 7 is a section view of an adapter-filter combination.

An example of a preferred flow pattern through the adapter 14 is illustrated in each of FIGS. 5–7. The path, diameter, and surface characteristics of the passageways of the adapter 14 can be designed to provide enhanced or tailored flow characteristics. For instance, the diameter of a passageway may be intentionally decreased in a portion of the adapter 14 where it would be advantageous to increase the pressure of the oil stream or the rate of flow. Conversely, the diameter of a given passageway may intentionally be increased in a portion of the adapter 14 where it may be advantageous to decrease the amount of pressure or rate of flow.

The filter 16 is in communication with the stream of oil, or other lubricant, after it has left the transmission 12, and is circulated by the oil circulator or oil pump. A filter 16 helps to ensure that very small particles of dirt and metal carried by the oil or lubricant do not continue through the system 10 and eventually reach the close-fitting transmission components and gears. FIG. 7 shows a possible adapter-filter combination. The filter 16 is commonly formed as a unit that includes a filter element and container. Preferably, the system 10 is a full-flow system, i.e., one in which all of the oil or lubricant will pass through the filter 16 before it continues along the circulation path back to the transmission 12. However, should the filter 16 become plugged, a relief valve included in the filter 16 will open and allow the oil or lubricant to bypass the filter. In a preferred embodiment, the filter 16 will be of the conventional spin-on-type, such as those used in connection with the filtration of engine oil for a vehicle, however, other designs that may be properly secured to the adapter 14 are within the scope of the present invention.

Preferably, the adapter 14 is mounted or secured to the transmission 12 via a plurality of apertures, e.g., bolt holes 24, corresponding to mating apertures in the transmission 12. If desired, an optional gasket (not shown) can be interposed between the adapter 14 and the transmission 12 to improve the seal between the components. A number of conventional transmission lubrication systems provide an access plate that is bolted to a transmission case. The present invention is advantageous in that the adapter can be designed to replace such an access plate, thereby permitting an adapter 14 to be readily retrofitted for such conventional systems.

The adapter 14 is cast or formed from a metal or other materials that are functionally compatible with the temperature, pressure, and additional requirements associated with the environment of the system 10. The adapter preferably has at least one transmission-to-adapter passageway 26 that is in communication with the transmission outlet 20 and the filter 16. The adapter 14 also includes at least one other passageway that is either in direct communication with the transmission inlet 22 or an oil cooler 18, when an oil cooler 18 is present in the system 10.

During operation, the temperature of a transmission 12 can be very high and routinely exceed that of an engine. Because of the amount of heat generated in connection with some applications, it is preferred that a special temperature seal is used in connection with the filter 16. An example of such a seal is a high temperature nitrile seal. In a preferred embodiment, the seal is in contact with the face of the filter 16 and is spun down towards the adapter 14 as the components engage one another. The seal also provides a means to further secure the filter 16 and help prevent the separation or unscrewing of the filter 16 from the adapter 14, which can be especially beneficial during excessive vibrations.

In a preferred embodiment of the invention, the system 10 further includes an oil cooler 18, such as a conventional oil cooler used in various vehicles, and an adapter 14 including at least one adapter-to-cooler passageway 28. The adapter-to-cooler passageway 28 facilitates the communication of filtered oil from the adapter 14 to a cooler entrance 30 of the oil cooler 18. The oil is circulated through the oil cooler 18 wherein the temperature of the oil is decreased by means of a conventional heat transfer process. For example, the stream of oil can flow in close proximity to a separate, but closely positioned counterflow of a much cooler fluid, thereby transferring the heat of the oil to such cooler fluid.

Upon exiting the oil cooler 18 through a cooler exit 32, the stream of oil is communicated, either directly or indirectly, to the transmission inlet 22. In a preferred embodiment, such as that depicted in FIG. 1, the oil is transmitted from the cooler exit 32 to a cooler-to-adapter passageway 34 in the adapter 14, and is circulated to the transmission through a transmission inlet 22. However, the present invention does not require that the oil pass through the adapter 14 between the oil cooler 18 and the transmission inlet 22, and the oil cooler 18 may instead be in direct communication with a transmission inlet 22 without first being routed back through the adapter 14.

When no oil cooler 18 is included in the system 10, the adapter 14 includes at least one transmission-to-adapter passageway 26 and an adapter-to-transmission passageway (not shown) in communication with the transmission inlet 22. In such a situation, the passageways of the adapter intended to flow to and from the oil cooler 18 can be closed-off or eliminated entirely, and the oil in the system 10 is circulated from the transmission 12, through the transmission-to-adapter passageway 26 of the adapter 14, to the filter 16. After the oil is filtered, it is circulated out of the filter 14, through the adapter-to-transmission passageway and into the transmission 12 via a transmission inlet 22.

The present invention is quite advantageous in that a single type of adapter 14 can be readily adapted for use with systems 10 that include or do not include conventional-type oil coolers 18. As previously mentioned, when no oil cooler 18 is included in the system 10, the passageway of the adapter 14 intended to circulate oil to and from such a cooler 18 can simply be closed off and the filtered, though "uncooled," oil is circulated back to the inlet 22 of the transmission. The blocking or constriction of flow can be accomplished by means of a formed cap, a screw-in closure, or other device commonly used to restrict the flow of fluid through a flow channel and pipe system. Alternatively, a second type of adapter 14 can be formed that intentionally excludes passageways for communication with an oil cooler 18 when the cooler is not included in the system 10.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications will come within the teachings of this invention and that such modifications are within its spirit and the scope as defined by the claims.

What is claimed is:

1. An adapter for an oil filtration system including a transmission and an external and accessible lubricant filter, said adapter comprising:

a first face for mounting to a transmission and a second face for connection to the filter;

a first inlet port extending through the first face for connection to the transmission and a first outlet port extending through the first face for connection to the transmission;

a second inlet port extending through the second face for connection to the filter and a second outlet port extending through the second face for connection to the filter, wherein the second face includes a periphery, the second outlet port being located at a position that is spaced radially inwardly of the periphery, the second inlet port being spaced radially inwardly from the second outlet port, a peripheral surface extending from the first face to the second face, a third inlet port extending through the peripheral surface for connection to the outlet of an oil cooler, a third outlet port extending through the peripheral surface for connection to the inlet of the oil cooler, a first passageway extending through the adapter from the first inlet port to the second outlet port, a second passageway extending through the adapter from the second inlet to the third outlet, a fourth passageway extending from the third inlet port to the first outlet port.

2. An adapter as recited in claim 1, wherein the filter is of the spin-on-type, and the means for securing the filter to the adapter is a set of matching threads.

* * * * *